US011438384B2

(12) United States Patent
Subramanian et al.

(10) Patent No.: US 11,438,384 B2
(45) Date of Patent: Sep. 6, 2022

(54) AGGREGATED NETWORKING SUBSYSTEM STATION MOVE CONTROL SYSTEM

(71) Applicant: Dell Products L.P., Round Rock, TX (US)

(72) Inventors: Saye Balasubramaniam Subramanian, Chennai (IN); Damodharan Sreenivasagaperumal, Chennai (IN)

(73) Assignee: Dell Products L.P., Round Rock, TX (US)

( * ) Notice: Subject to any disclaimer, the term of this patent is extended or adjusted under 35 U.S.C. 154(b) by 95 days.

(21) Appl. No.: 17/153,072

(22) Filed: Jan. 20, 2021

(65) Prior Publication Data
US 2022/0232037 A1    Jul. 21, 2022

(51) Int. Cl.
*H04L 9/40*    (2022.01)

(52) U.S. Cl.
CPC .................................. *H04L 63/20* (2013.01)

(58) Field of Classification Search
CPC ........................................................ H04L 63/20
See application file for complete search history.

(56) References Cited

U.S. PATENT DOCUMENTS

| 9,014,011 | B2* | 4/2015 | Natarajan | H04L 45/28 370/242 |
| 2012/0093004 | A1* | 4/2012 | Nishi | H04L 41/0631 370/242 |
| 2016/0301608 | A1* | 10/2016 | Natarajan | H04L 12/2865 |
| 2019/0132240 | A1* | 5/2019 | Natarajan | H04L 49/354 |
| 2021/0014155 | A1* | 1/2021 | Punj | H04L 49/3027 |
| 2021/0135903 | A1* | 5/2021 | Natarajan | H04L 12/4675 |
| 2021/0184987 | A1* | 6/2021 | Rajendiran | H04L 47/82 |
| 2022/0014481 | A1* | 1/2022 | Rajagopalan | H04L 45/66 |

* cited by examiner

*Primary Examiner* — Kambiz Zand
*Assistant Examiner* — Aubrey H Wyszynski
(74) *Attorney, Agent, or Firm* — Joseph Mencher

(57) ABSTRACT

An aggregated networking device subsystem station move control system includes first and second aggregated networking devices connected via an ICL. The first aggregated networking device receives a MAC address from the second aggregated networking device that was learned on an orphan port that has port security enabled and a station-move-deny configuration, and generates a static MAC address entry in its MAC address table that associates the MAC address with the ICL. The static MAC address entry causes data packets received on non-ICL ports on the first aggregated networking device that include the MAC address to generate a static MAC move violation. The first aggregated networking device also programs rule(s) that, in response to data packets being received on its non-ICL ports that have port security disabled and generating a static MAC move violation, causes the association of the MAC address with that non-ICL port.

20 Claims, 13 Drawing Sheets

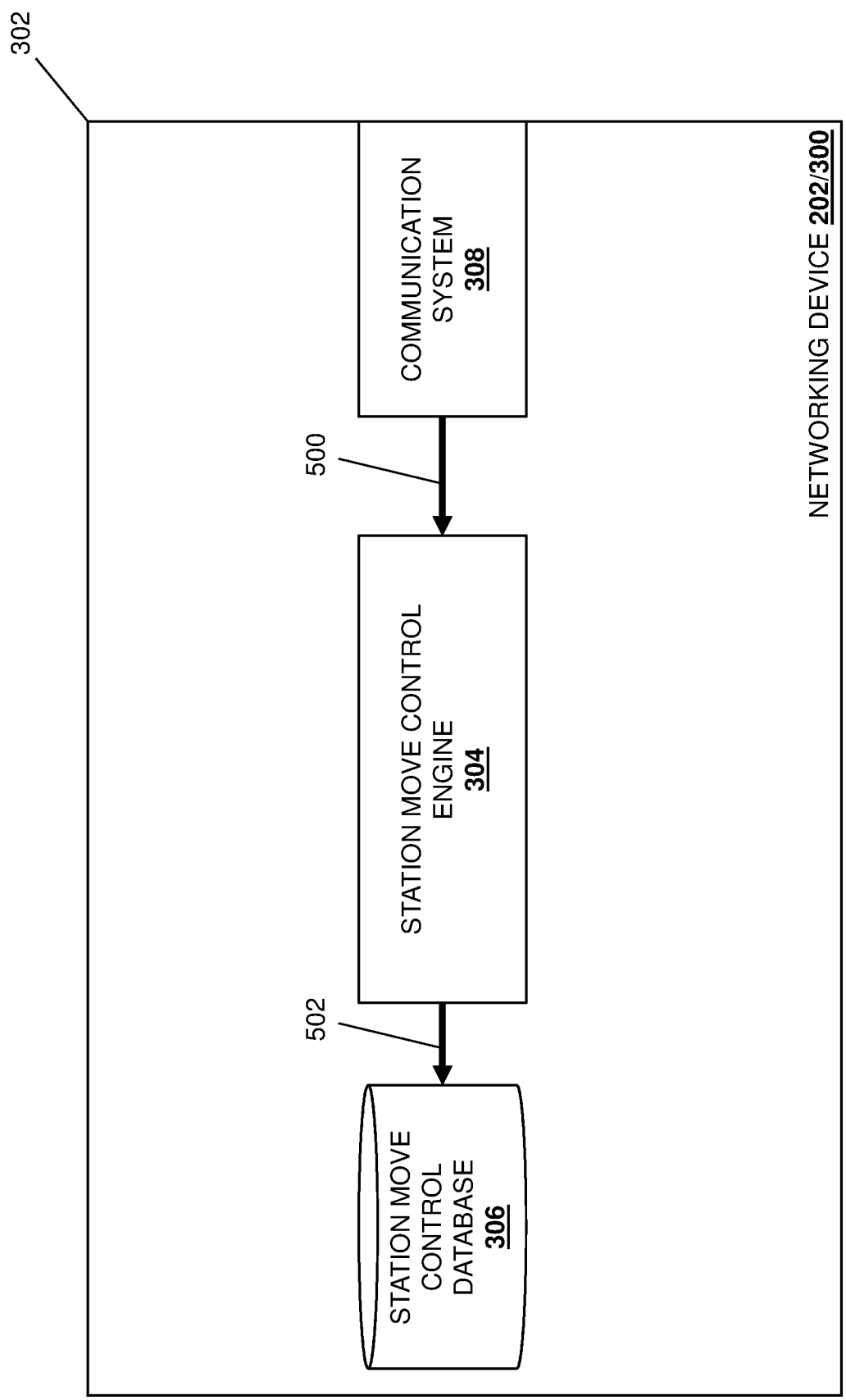

AGGREGATED NETWORKING SUBSYSTEM STATION MOVE CONTROL SYSTEM

BACKGROUND

The present disclosure relates generally to information handling systems, and more particularly to performing station move control operations with aggregated networking information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handlings systems such as networking devices sometimes utilize station move control functionality in order to enhance security with regard to communications received over a network. For example, a networking device such as a switch device may include a first and second port that are connected to a relatively unsecure network (e.g., a public network such as the Internet), and a third port that is connected to a relatively secure network (e.g., a private network such as a private Local Area Network (LAN)). In such situations, it may be desirable to enable port security on the first and second ports connected to the relatively unsecure network, while port security on the third port connected to the relatively secure network may be disabled. In a specific example, such port security may be enabled on the first and second ports and either (or both) of those ports may be configured as station-move-deny (also known as Media Access Control (MAC)-move-deny) ports, while the third port may have port security disabled.

As will be appreciated by one of skill in the art in possession of the present disclosure, station-move-deny ports on a switch device may receive data packets from connected devices and will learn the MAC addresses associated with those connected devices and included in those data packets, and once a MAC address of a connected device is learned on one station-move-deny port on the switch device, that MAC address cannot "move" to another port-security-enabled port on that switch device (although that MAC address will be allowed to "move" to a port on that switch device with port security disabled.) As such, the first station-move-deny port on the switch device discussed above may receive a first data packet including a first MAC address, and will learn that first MAC address (e.g., a MAC table in the switch device will be configured to associate the first MAC address with the first station-move-deny port).

Subsequently, if a second packet including the first MAC address is received at the second port-security-enabled port on the switch device discussed above, that first MAC address will not be allowed to "move" to the second port-security-enabled port (e.g., the MAC table in the switch device that associates the first MAC address with the first station-move-deny port will not be modified to associate the first MAC address with the second port-security-enabled port, and the second packet may be dropped). However, if a second packet including the first MAC address is received at the third port on the switch device discussed above that has port security disabled, the first MAC address will be allowed to "move" to the third port (e.g., the MAC table in the switch device that associates the first MAC address with the first station-move-deny port will be modified to associate the first MAC address with the third port). Thus, the first and second ports connected to the relatively unsecure network may be provided with enhanced security in order to, for example, prevent the "spoofing" of a MAC address of a device that is connected to the first port in order to send a malicious data packet via the second port.

However, the station move control functionality discussed above is provided by the Network Processing Unit (NPU) in the switch device and is limited in use to a single switch device, which can present issues when switch devices are aggregated. For example, switch devices may be aggregated according to the Virtual Link Trunking (VLT) protocol, which is a proprietary aggregation protocol that may be utilized in switch devices available from DELL® Inc. of Round Rock Tex., United States. One of skill in the art in possession of the present disclosure will appreciate that the VLT protocol may be used to provide an aggregated networking device subsystem (e.g., a VLT pair) with a first switch device (e.g., a first VLT node) and a second switch device (e.g., a second VLT node), and operates to allow an aggregated link (e.g., a VLT Link Aggregation Group (LAG)) to the first and second VLT nodes in the VLT pair in order to offer connected devices a redundant, load-balancing connection to the network behind the VLT pair in a loop-free environment while eliminating the use of the spanning-tree protocol. In such aggregated networking device subsystem/VLT pair scenarios, the station move control functionality may be desirable across ports on both the first and second VLT nodes in the VLT pair so that any MAC address learned on a station-move-deny port in the VLT pair cannot move to a different port-security-enabled port in the VLT pair (but while being allowed to move to ports in VLT pair that do not have port security enabled).

However, as discussed above, conventional station move control functionality is enabled by the NPU in the switch device, and thus is limited to being provided on ports provided on a single switch device. In the VLT pair scenario discussed above, information about ports on the first and second VLT nodes in the VLT pair that provide a VLT LAG is shared between the first and second VLT nodes. As such, details about a first port (e.g., its configuration as a station-move-deny port, MAC addresses learned by that port, etc.) on a first VLT node that is part of a VLT LAG will be known to the second VLT node such that if a MAC address learned on that first station-move-deny port on the first VLT node is then received by a second port-security-enabled port on the second VLT node that is also a part of the VLT LAG, that MAC address will not be allowed to move to the second port-security-enabled port.

However, VLT nodes in a VLT pair may also include "orphan" ports (e.g., ports on the VLT node that are not part of a VLT LAG), and when a MAC address is learned on an "orphan" port on a first VLT node and then later received by a port on the second VLT node (e.g., an "orphan" port or a VLT LAG port on that second VLT node), the NPU in the second VLT node will not be able to perform the station-move-deny functionality discussed above because it is not aware of the details of the "orphan" port on the first VLT node. As will be appreciated by one of skill in the art in possession of the present disclosure, MAC addresses that are learned on ports on the first VLT node are associated with the ICL between the first VLT node and the second VLT node (e.g., a MAC address learned on a first port on the first VLT node will be provided as a dynamic MAC address associated with the ICL in a MAC table of the second VLT node), and ICL ports cannot be configured with the station-move-deny functionality discussed above. As such, when a MAC address is learned on an "orphan" station-move-deny port on a first VLT node and then later received by a port-security-enabled port on the second VLT node, the NPU in the second VLT node will not know to disallow an associated MAC address move because it does not know that the "orphan" port on the first VLT node is configured as a station-move-deny port. Thus, conventional aggregated networking device subsystems/VLT pairs simply allow MAC address moves in such situations (i.e., when a MAC address is learned on an "orphan" station-move-deny port on a first VLT node and then later received by a port-security-enabled port on the second VLT node), thus ignoring the security configurations of those ports and reducing the security of the network.

Accordingly, it would be desirable to provide an aggregated networking device subsystem station move control system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a station move control engine that is configured to: receive, from an aggregated networking device, a Media Access Control (MAC) address that was learned on an orphan port that is included on the aggregated networking device, that has port security enabled, and that is configured as a station-move-deny port; generate, in a MAC address table, a static MAC address entry that associates the MAC address with an ICL that connects the processing system to the aggregated networking device, wherein the static MAC address entry is configured to cause data packets that are received on non-ICL ports connected to the processing system and that include the MAC address to generate a static MAC move violation; and program at least one rule that, in response to a data packet being received on a non-ICL port connected to the processing system that has port security disabled and generating a static MAC move violation, provides for the association of the MAC address with that non-ICL port.

BRIEF DESCRIPTION OF THE DRAWINGS

FIG. 5B is a schematic view illustrating an embodiment of the networking device of FIG. 3 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
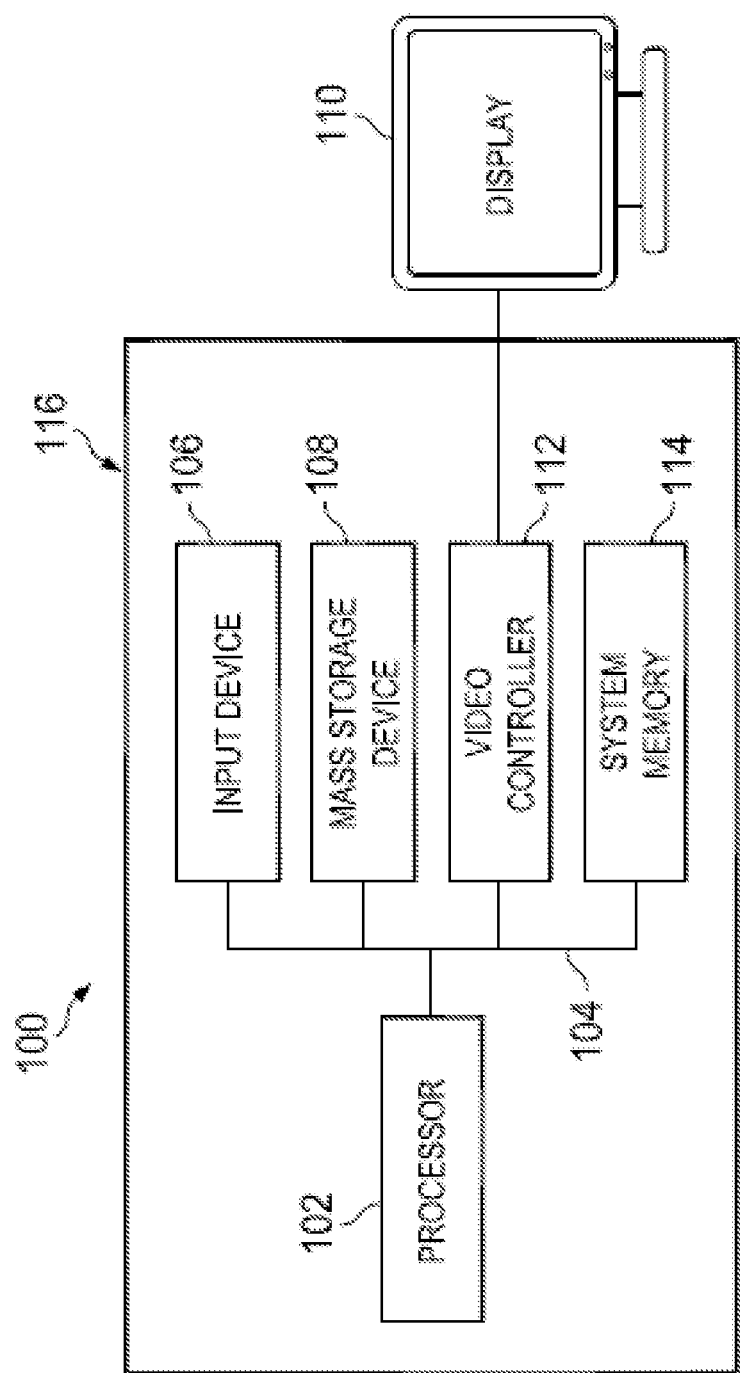
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
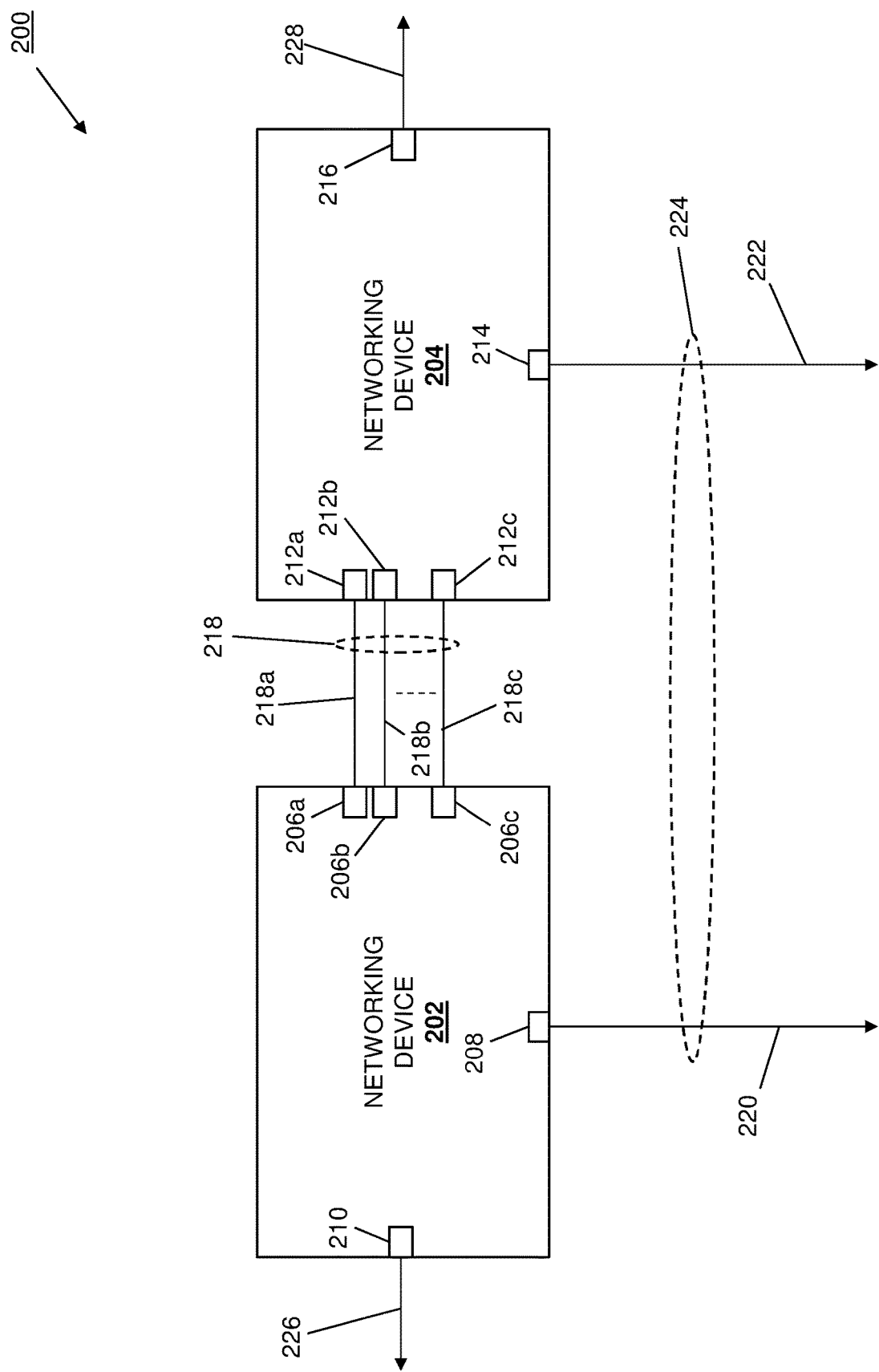
FIG. 2 is a schematic view illustrating an embodiment of an aggregated networking device subsystem that may provide the aggregated networking device subsystem station move control system of the present disclosure.

Referring now to FIG. 2, an embodiment of an aggregated networking device subsystem 200 is illustrated. In the illustrated embodiment, the aggregated networking device subsystem 200 includes a networking device 202 and a networking device 204. In an embodiment, each of the networking devices 202 and 204 may be provided by the IHS 100 discussed above with reference to FIG. 1, and/or may include some or all of the components of the IHS 100, and in specific examples below are discussed as being provided by switch devices configured according to the VLT protocol available from the DELL® Inc. of Round Rock, Tex., United States. However, while illustrated and discussed as being provided by switch devices configured according to a particular aggregation protocol, one of skill in the art in possession of the present disclosure will recognize that aggregated networking devices provided in the aggregated networking device subsystem 200 may include any devices that may be configured to operate similarly as the networking devices 202 and 204 discussed below.

In the illustrated embodiment and for the purposes of the examples provided below, the networking device 202 includes a plurality of Inter-Chassis Link (ICL) Ports 206*a*, 206*b*, and up to 206*c*; a Link Aggregation Group (LAG) port 208; and an orphan port 210. Similarly, the networking device 204 includes a plurality of ICL Ports 212*a*, 212*b*, and up to 212*c*; a LAG port 214; and an orphan port 216. As illustrated, the networking devices 202 and 204 may be coupled to each other by connecting the ICL ports 206*a*-206*c* to the ICL ports 212*a*-212*c* to provide an ICL 218 that includes a plurality of aggregated links 218*a*, 218*b*, and up to 218*c*. Furthermore, the LAG port 208 on the networking device 202 may provide a link 220 to a relatively public network (e.g., the Internet), the LAG port 214 on the networking device 204 may provide a link 222 to that relatively public network, and the links 220 and 222 may be aggregated to provide a LAG 224. Finally, the orphan port 210 on the networking device 202 may provide a link 226 to a relatively private network (e.g., a Local Area Network (LAN)), and the orphan port 216 on the networking device 204 may provide a link 228 to that relatively private network. In a specific example in which the VLT protocol has been used to aggregate the networking devices 202 and 204 to provide a "VLT pair", the networking device 202 may be considered a "first VLT node", the networking device 204 may be considered a "second VLT node", and the LAG 224 may be considered a "VLT LAG".

One of skill in the art in possession of the present disclosure will appreciate that the "orphan" designation of the ports 226 and 228 on the networking devices 202 and 204 may refer to the fact that those ports 226 and 228 do not provide links that have been aggregated between the networking devices 202 and 204 (e.g., like the LAG ports 208 and 214 that provide the links 220 and 222 that are aggregated as part of the LAG 224). Furthermore, while the networking devices 202 and 204 are each illustrated and described below as including one orphan port and one LAG port for the purposes of the examples provided below, one of skill in the art in possession of the present disclosure will appreciate that networking devices may include more orphan ports and/or LAG ports while remaining within the scope of the present disclosure as well. Further still, while a specific aggregated networking device subsystem 200 has been illustrated and described, one of skill in the art in possession of the present disclosure will recognize that the aggregated networking device subsystem of the present disclosure may include a variety of components and component configurations while remaining within the scope of the present disclosure as well.

Figure 3:
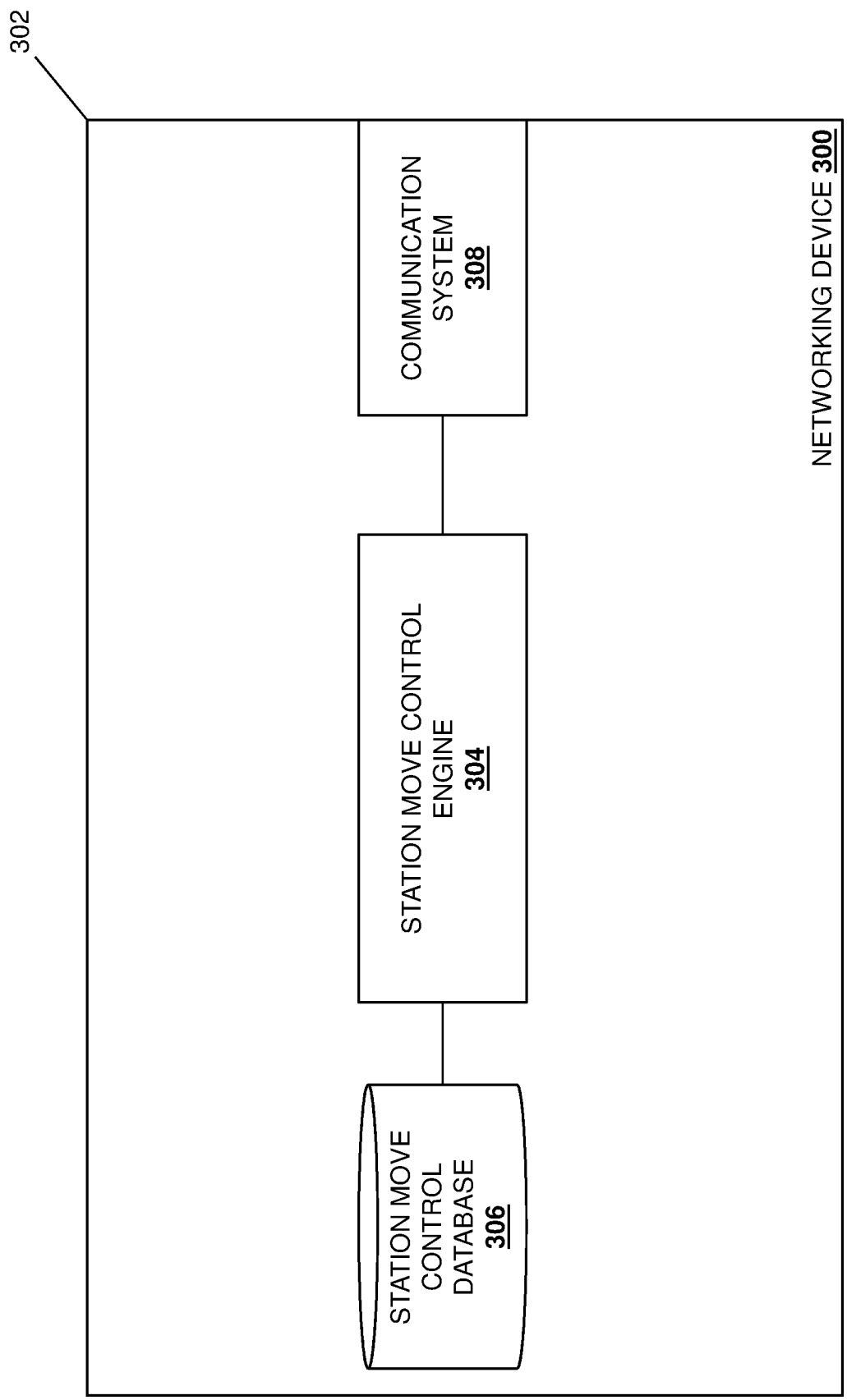
FIG. 3 is a schematic view illustrating an embodiment of a networking device that may be included in the aggregated networking device subsystem of FIG. 2.

Referring now to FIG. 3, an embodiment of a networking device 300 is illustrated that may provide the networking devices 202 and 204 discussed above with reference to FIG. 2. As such, the networking device 300 may be provided by the IHS 100 discussed above with reference to FIG. 1 and/or may include some or all of the components of the IHS 100, and in specific examples may be provided by a switch device configured according to the VLT protocol available from the DELL® Inc. of Round Rock, Tex., United States. However, while illustrated and discussed as being provided by a switch device configured according to a particular aggregation protocol, one of skill in the art in possession of the present disclosure will recognize that the functionality of the networking device 300 discussed below may be provided by other devices that are configured to operate similarly as the networking device 300 discussed below. In the illustrated embodiment, the networking device 300 includes a chassis 302 that houses the components of the networking device 300, only some of which are illustrated below.

For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a station move control engine 304 that is configured to perform the functionality of the station move control engines and/or networking devices discussed below. In the specific examples provided below, the processing system includes a network processing subsystem (e.g., a Network Processing Unit (NPU)) that performs some of the functionality of the station control engine 304, a central processing subsystem (e.g., a Central Processing Unit (CPU)) that performs some of the functionality of the station control engine 304, and at least one hardware device (e.g., a Field Processor (FP)) that performs some of the functionality of the station control engine 304. However, while particular processing system components are described below, one of skill in the art in possession of the present disclosure will recognize that the functionality of the station move control engine 304 may be provided by a variety of other processing components while remaining within the scope of the present disclosure as well.

The chassis 302 may also house a storage system (not illustrated, but which may include the storage 108 discussed above with reference to FIG. 1) that is coupled to the station move control engine 304 (e.g., via a coupling between the storage system and the processing system) and that includes a station move control database 306 that is configured to store any of the information utilized by station move control engine 304 discussed below. The chassis 302 may also house a communication system 308 that is coupled to the station move control engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure.

For example, the communication system 308 may include any of the ICL ports 206a-206c, the LAG port 208, and the orphan port 210 on the networking device 202/300 discussed above with reference to FIG. 2 (when the networking device 202 is provided by the networking device 300), and may include any of the ICL ports 212a-212c, the LAG port 214, and the orphan port 216 on the networking device 204/300 discussed above with reference to FIG. 2 (when the networking device 204 is provided by the networking device 300). However, while a specific networking device 300 has been illustrated and described, one of skill in the art in possession of the present disclosure will recognize that networking devices (or other devices operating according to the teachings of the present disclosure in a manner similar to that described below for the networking device 300) may include a variety of components and/or component configurations for providing conventional networking device functionality, as well as the functionality discussed below, while remaining within the scope of the present disclosure as well.

Figure 4:
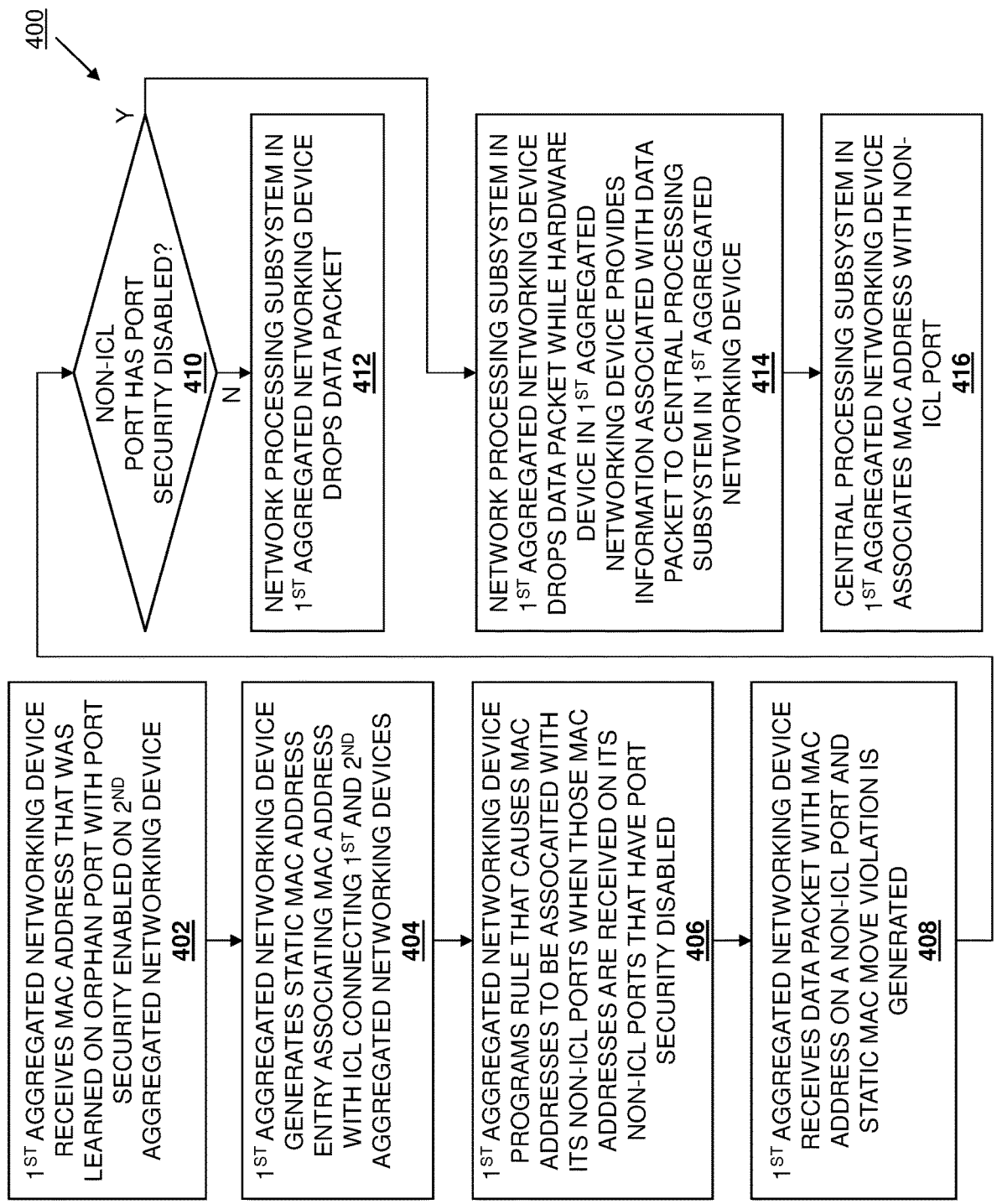
FIG. 4 is a flow chart illustrating an embodiment of a method for providing station move control in an aggregated networking device subsystem.

Referring now to FIG. 4, an embodiment of a method 400 for providing station move control in an aggregated networking device subsystem is illustrated. As discussed below, the systems and methods of the present disclosure provide, when a MAC address is learned on an orphan port on a second aggregated networking device, for the generation of a static MAC address entry in a first aggregated networking device that associates that MAC address with an ICL that connects the first and second aggregated networking device, and the programming of a rule that causes the association of that MAC address with non-ICL ports on the first aggregated networking device when it is received on those non-ICL ports that have their port security disabled. For example, the aggregated networking device subsystem station move control system of the present disclosure may include first and second aggregated networking devices connected via an ICL and aggregated to provide an aggregated networking device subsystem. The first aggregated networking device receives a MAC address from the second aggregated networking device that was learned on an orphan port that has port security enabled and that is configured as a station-move-deny port, and generates a static MAC address entry in its MAC address table that associates the MAC address with the ICL. The static MAC address entry causes data packets received on non-ICL ports on the first aggregated networking device that include the MAC address to generate a static MAC move violation. The first aggregated networking device also programs rule(s) that, in response to data packets being received on its non-ICL ports that have port security disabled and generating a static MAC move violation, provide for the association of the MAC address with that non-ICL port. As such, station move control functionality that is conventionally only available on a single networking device may be provided with ports that are included on different aggregated networking devices in an aggregated networking device subsystem.

Figure 5A:
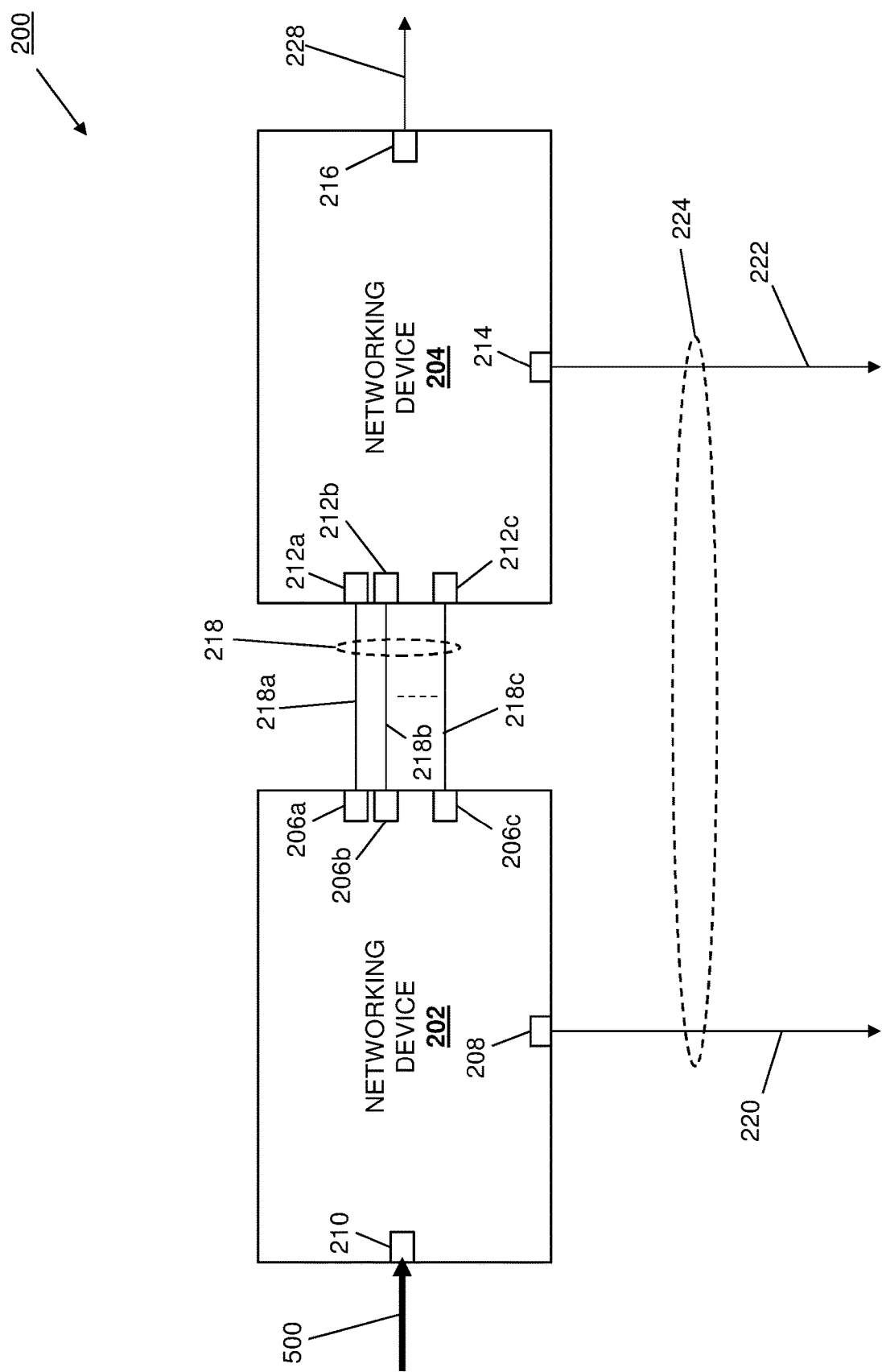
FIG. 5A is a schematic view illustrating an embodiment of the aggregated networking device subsystem of FIG. 2 operating during the method of FIG. 4.

The method 400 begins at block 402 where a first aggregated networking device receives a MAC address that was learned on an orphan port with port security enabled on a second aggregated networking device. In an embodiment, during or prior to the method 400, a network administrator and/or other user may enable port security on the orphan port 210 on the networking device 202/300, and in specific examples may configure the orphan port 210 as a station-move-deny port (also known as a MAC-move-deny port). With reference to FIGS. 5A and 5B, in an embodiment of block 402, the station move control engine 304 in the networking device 202/300 may perform data packet receiving operations 500 that include receiving a data packet via the link 226 provided by the orphan port 210 in its communication system 308, and one of skill in the art in possession of the present disclosure will recognize that a variety of devices connected to the link 206 (and the private network to which it is coupled) may generate and transmit that data packet at block 402. As also illustrated in FIG. 5B, the station move control engine 304 in the networking device 202/300 may then perform MAC address learning operations 502 that may include the station move control engine 304 in the networking device 202/300 identifying a MAC address in the data packet received as part of the data packet receiving operations 500 (i.e., the MAC address of the device that generated and transmitted that data packet), and generating a dynamic MAC address entry in a MAC address table in the station move control database 306 in the networking device 202/300 that associates that MAC address with the orphan port 210.

Figure 5C:
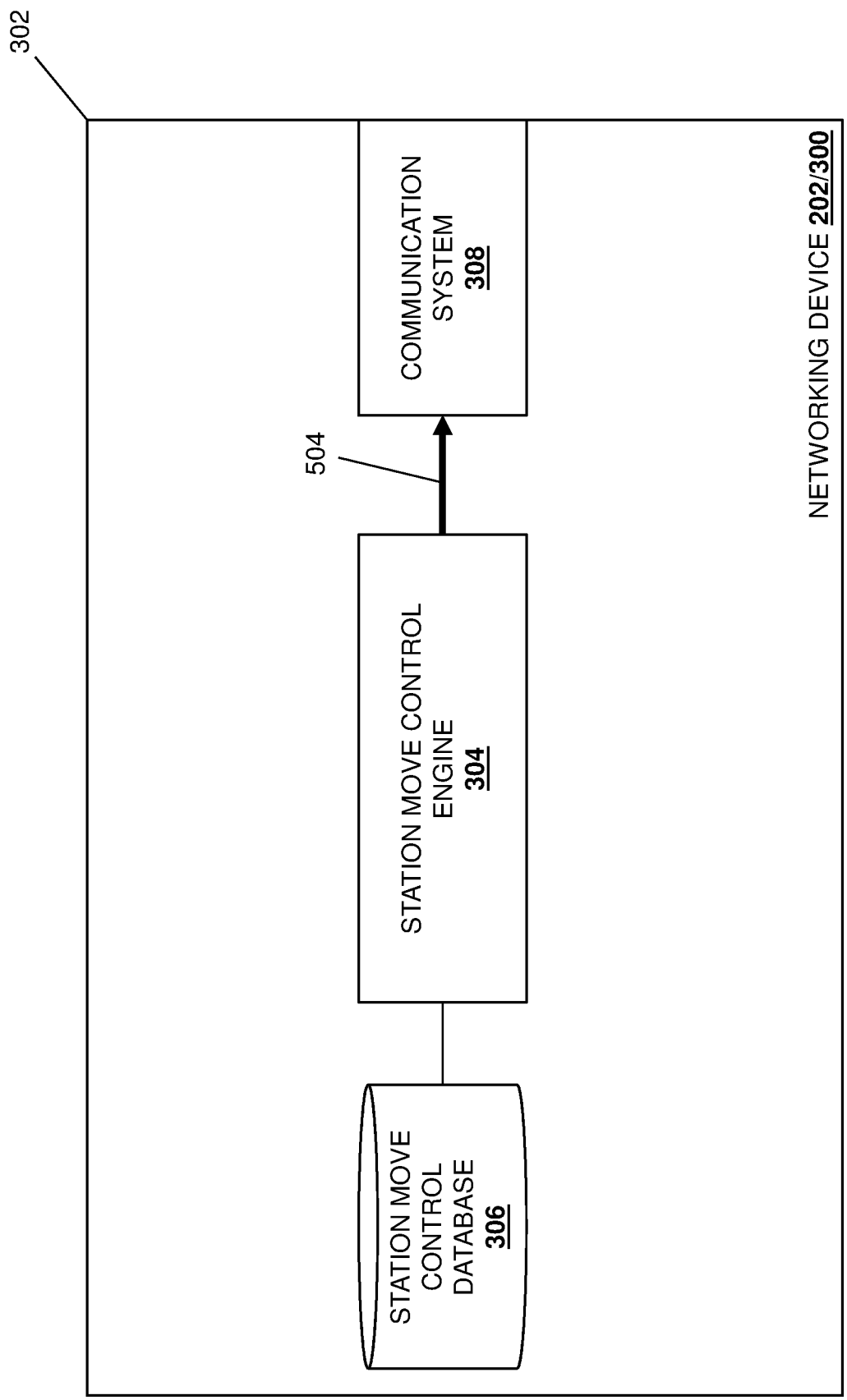
FIG. 5C is a schematic view illustrating an embodiment of the networking device of FIG. 3 operating during the method of FIG. 4.
Figure 5D:
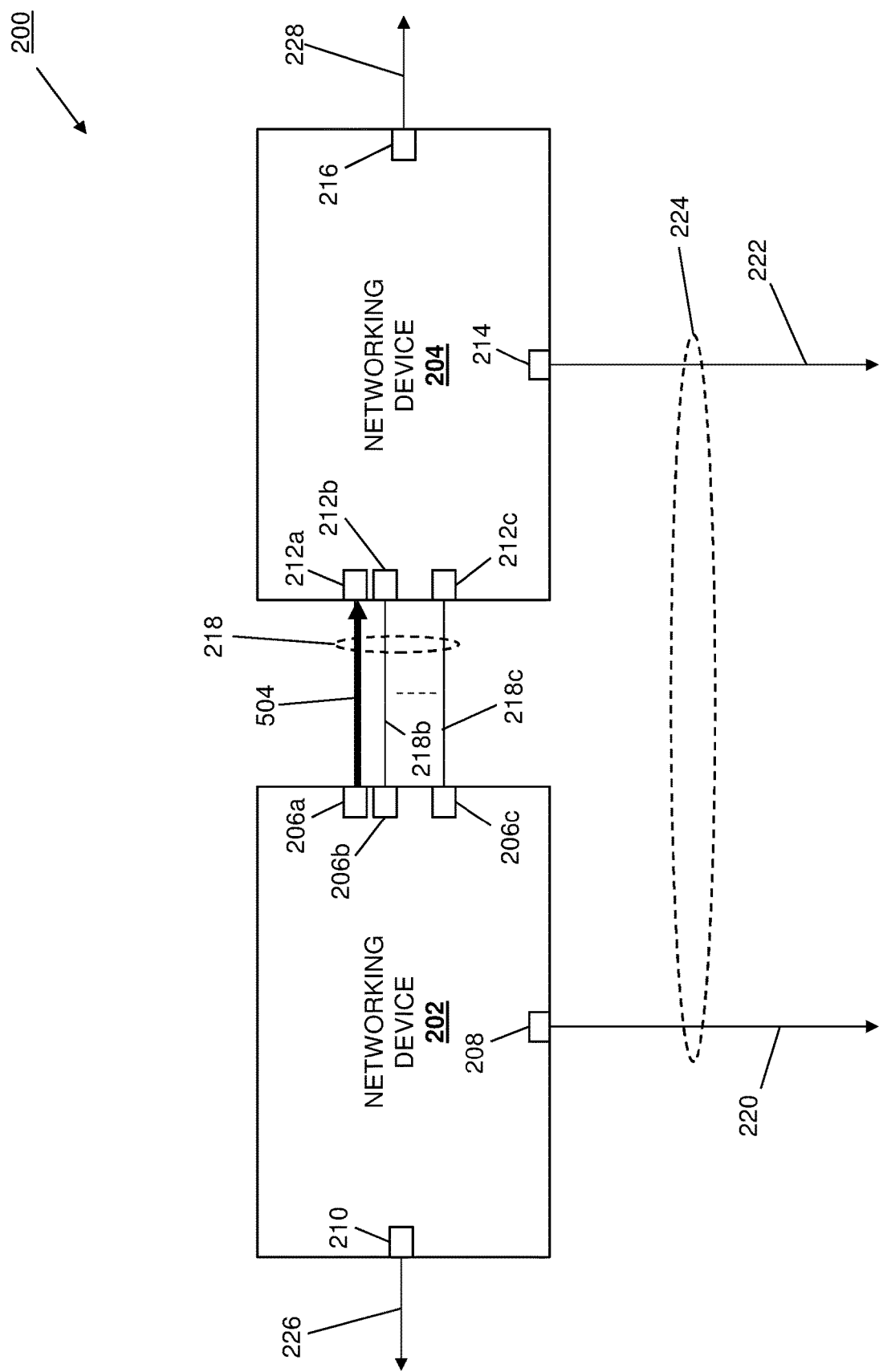
FIG. 5D is a schematic view illustrating an embodiment of the aggregated networking device subsystem of FIG. 2 operating during the method of FIG. 4.
Figure 5E:
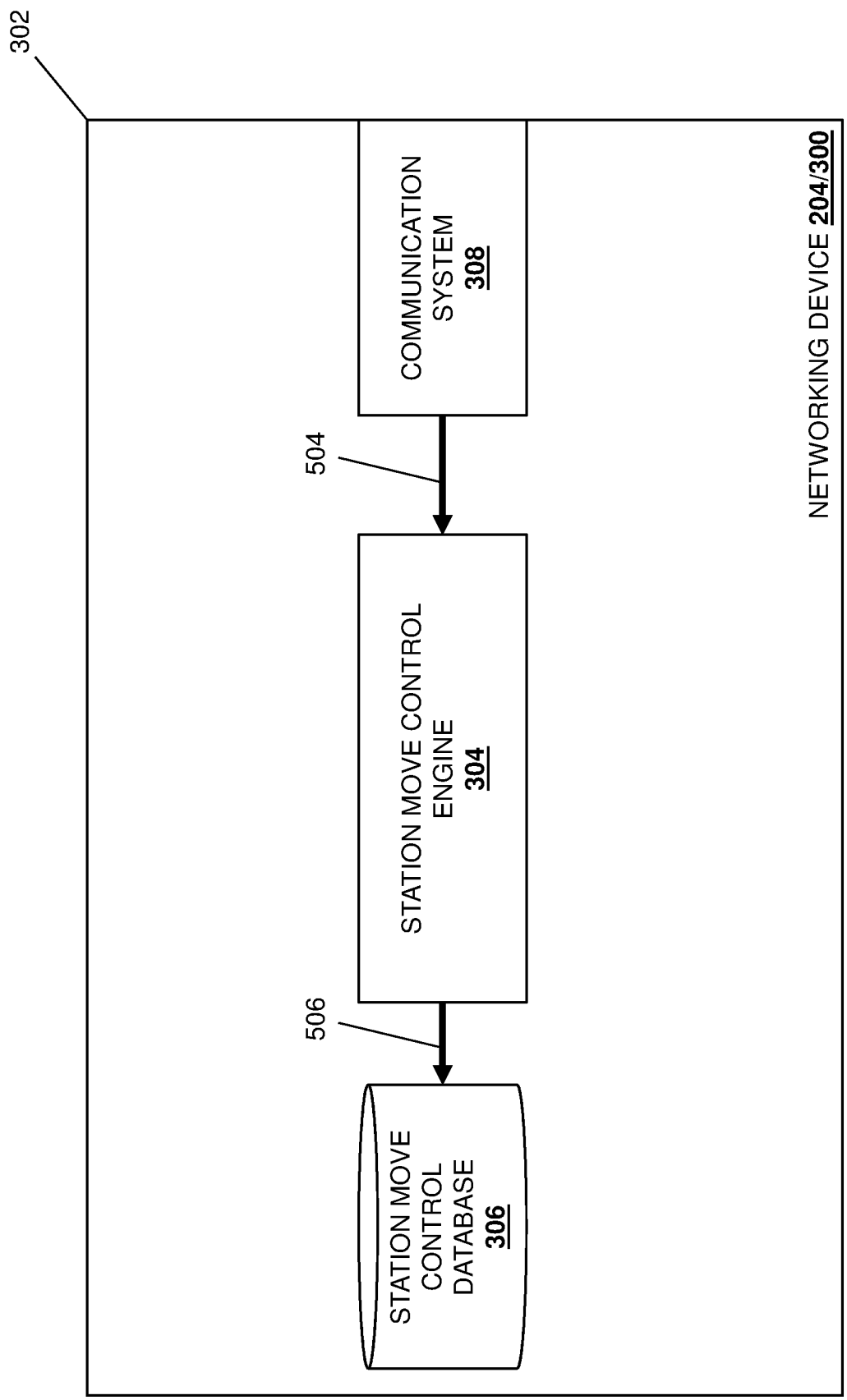
FIG. 5E is a schematic view illustrating an embodiment of the networking device of FIG. 3 operating during the method of FIG. 4.

With reference to FIGS. 5C and 5D, at block 402 and in response to learning the MAC address on the port-security-enabled orphan port 210 configured as a station-move-deny port, the station move control engine 304 may perform MAC address communication operations 504 that include transmitting a MAC address communication that identifies that MAC address via the ICL port 206a in its communication system 308 and over the aggregated link 218a in the ICL 218. However, while the MAC address communication is illustrated and described as being transmitted via a particular ICL port that provides a particular aggregated link in the ICL 218, one of skill in the art in possession of the present disclosure will appreciate that the MAC address communication may be transmitted via other ICL ports that provide other aggregated links in the ICL 218 while remaining within the scope of the present disclosure as well. With reference to FIGS. 5D and 5E, at block 402 and as part of the MAC address communication operations 504, the station move control engine 304 in the networking device 204/300 may receive the MAC address communication via the aggregated link 218a provided by its ICL port 212a in its communication system 308.

The method 400 then proceeds to block 404 where the first aggregated networking device generates a static MAC address entry associating the MAC address with an ICL connecting the first and second aggregated networking devices. With reference to FIG. 5E, in an embodiment of block 404, the station move control engine 304 in the networking device 204/300 may then perform MAC address association operations 506 that may include the station move control engine 304 in the networking device 202/300 identifying the MAC address in the MAC address communication received as part of the MAC address communication operations 504 (i.e., the MAC address of the device that generated and transmitted the data packet to the orphan port 210 on the networking device 202/300), determining that MAC address was received via an port-security-enabled orphan port configured as a station-move-deny port on the networking device 202/300 and, in response, generating a static MAC address entry in a MAC address table in the station move control database 306 in the networking device 204/300 that associates that MAC address with the ICL 218.

In a specific example, the networking devices 202 and 204 in the aggregated networking device subsystem 200 may operate to synchronize the details of their respective orphan ports 210 and 216 (and any station-move-deny configurations provided thereon). As such, when the MAC address is learned on the orphan port 210 on the networking device 202 in the aggregated networking device subsystem 200, the networking device 202 will synchronize those details with the networking device 204, which allows the networking device 204 to generate the static MAC address entry in the MAC address table in its station move control database 306 that associates that MAC address with the ICL 218. Furthermore, one of skill in the art in possession of the present disclosure will appreciate that the ICL 218 may be viewed as a "link aggregated port" that includes the ICL ports 218a, 218b, and 218c as members, which allows the MAC address to be associated with the ICL 218/link aggregated port at block 404.

As will be appreciated by one of skill in the art in possession of the present disclosure, the provisioning of a static MAC address entry in a MAC address table in a networking device that associates a MAC address with port(s) on that networking device will cause a static MAC move violation to occur if that MAC address is included in a data packet that is received on any other port on that networking device. As such, the generation of the static MAC address entry in the MAC address table in the station move control database 306 in the networking device 204/300 that associates the MAC address in the MAC address communication with the ICL 218 will provide for the generation of static MAC move violations in the event that MAC address is received on any non-ICL ports on the networking device 204/300 (e.g., the ports 214 and 216). Furthermore, while not described in detail herein, in the event a MAC address is learned on the orphan port 210 on the networking device 202/300 that has its port security disabled, a similar MAC address communication may be sent by the networking device 202 to the networking device 204 to cause that MAC address to be provided in a dynamic MAC address entry in the MAC address table in the networking device 204 that associates that MAC address with the ICL 218, and that dynamic MAC address entry will not cause similar MAC move violations to occur if that MAC address is included in a data packet that is received on any other port on the networking device 204/300

Figure 5F:
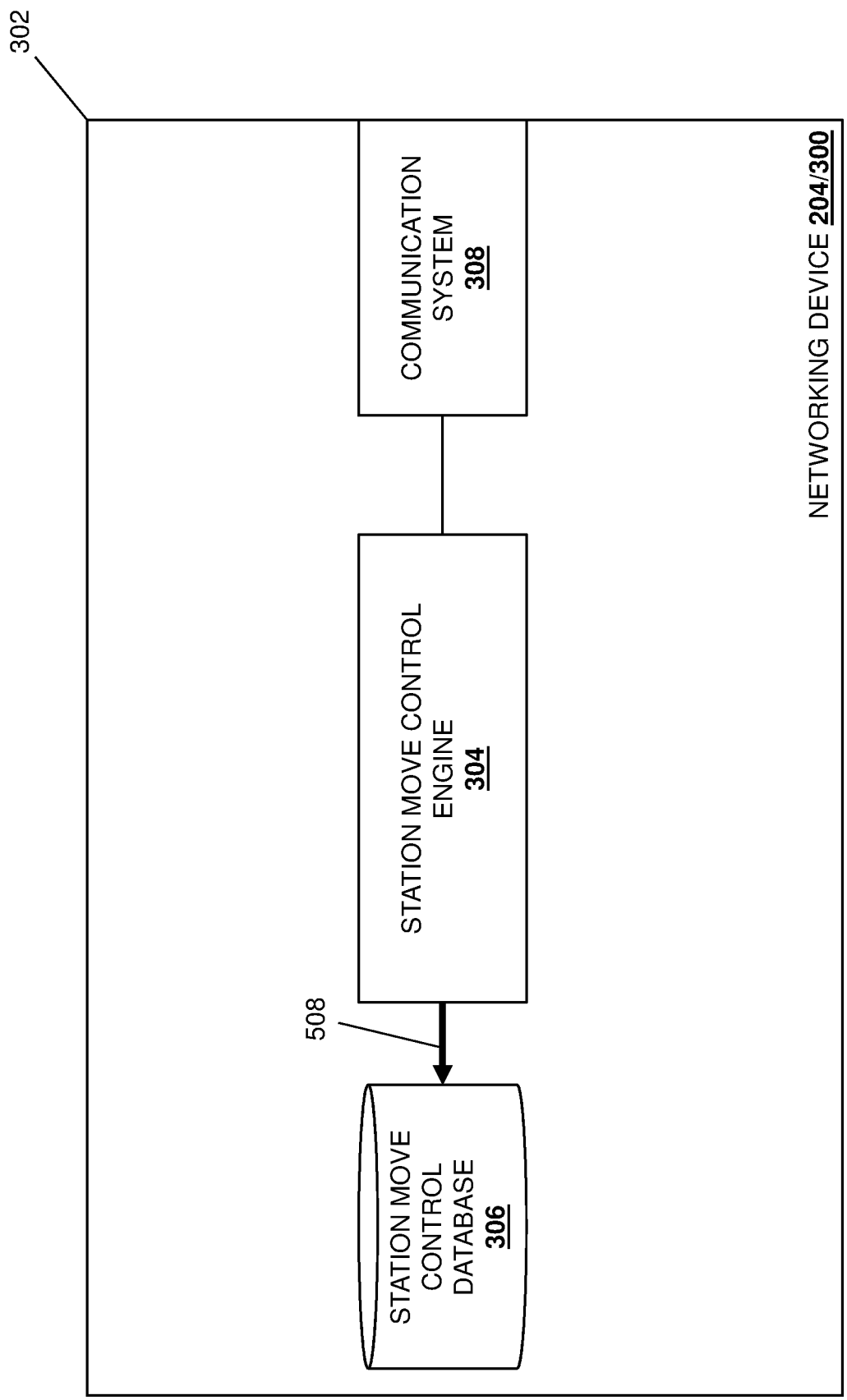
FIG. 5F is a schematic view illustrating an embodiment of the networking device of FIG. 3 operating during the method of FIG. 4.

The method 400 then proceeds to block 406 where the first aggregated networking device programs a rule that causes MAC addresses to be associated with its non-ICL ports when those MAC addresses are received on its non-ICL ports that have port security disabled. With reference to FIG. 5F, in an embodiment of block 406, the station move control engine 304 in the networking device 204/300 may perform rule programming operations 508 that include programming at least one rule (e.g., in the station move control database 306 in the illustrated embodiment) that will cause the association of the MAC address received in the MAC address communication from the networking device 202 with one of its non-ICL ports (e.g., the ports 214 or 216) when that MAC address is received on those non-ICL ports that have their port security disabled. For example, as discussed below, the at least one rule programmed at block 406 may operate to notify a central processing subsystem in the networking device 204 when a static MAC move violation is caused by a data packet received on a port-security-disabled non-ICL port on the networking device 204, which allows that central processing subsystem to then associate the MAC address in that data packet with that port-security-disabled non-ICL port.

As discussed above, in a specific example the processing system in the networking device 204/300 that provides the station move control engine 304 may include a hardware device such as a field processor, and the station move control database 306 may be configured to store field processor entries/hardware rules that cause the field processor to perform some action in response to received data packets and based on configured qualifiers. As such, at block 406, the station move control engine 304 (e.g., provided by the network processing subsystem) in the networking device 204/300 may operate to provide a field processor entry that will "lift" or otherwise provide information associated with data packets that are received on a port-security-disabled non-ICL port on the networking device 204 and that have generated a static MAC move violation to the central processing subsystem in the networking device 204, with the field processor entry including a qualifier information that designates static MAC move violations, port information that designates ports with port security disabled, and action information that instructs the provisioning of information associated with those data packets to the central processing subsystem in the networking device 204. However, while a specific technique for programming a rule that causes the association of a MAC address with non-ICL ports when that MAC address is received on non-ICL ports that have port security disabled has been described, one of skill in the art in possession of the present disclosure will appreciate that other techniques for providing similar functionality will fall within the scope of the present disclosure as well.

Figure 6:
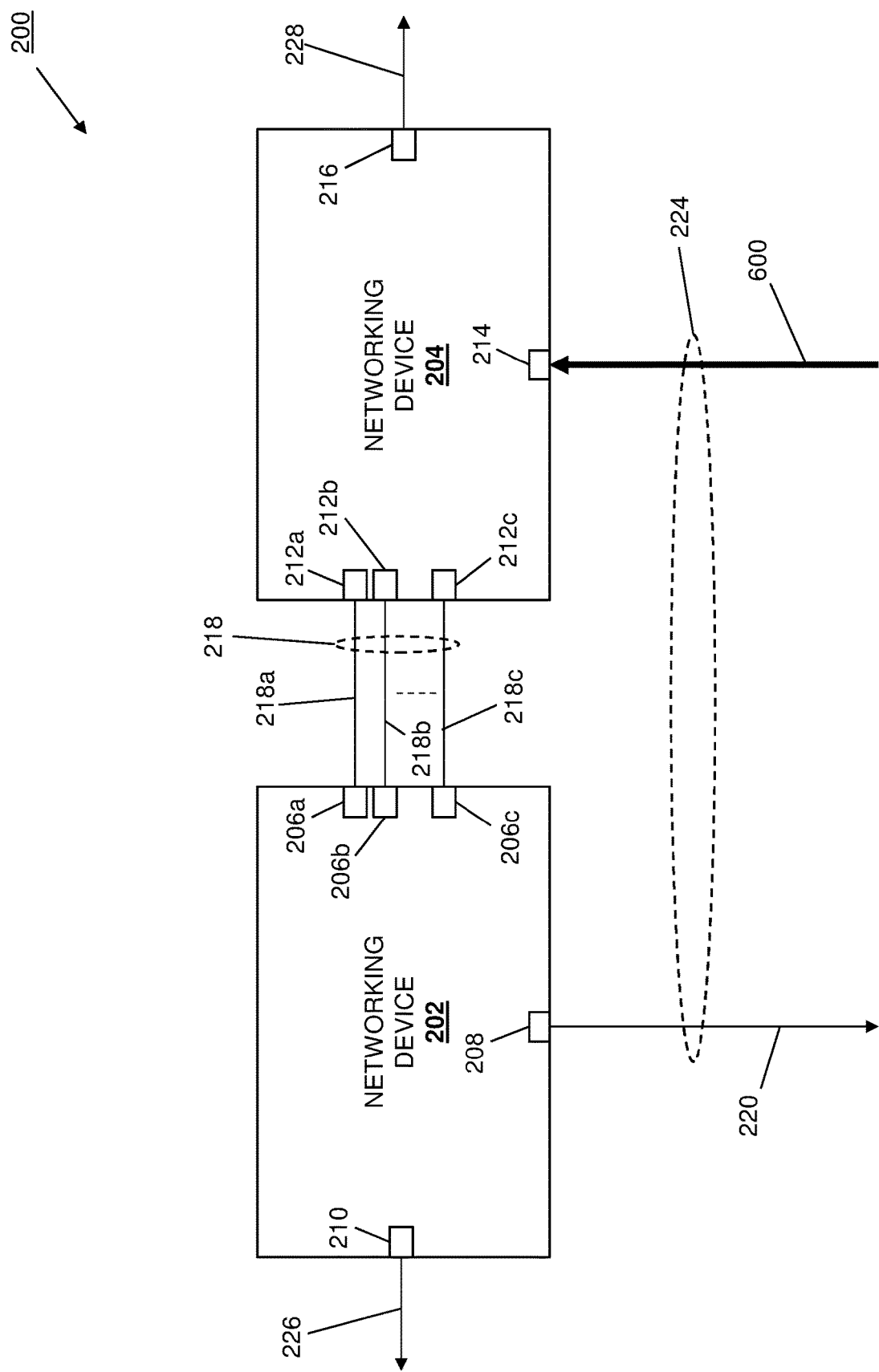
FIG. 6 is a schematic view illustrating an embodiment of the aggregated networking device subsystem of FIG. 2 operating during the method of FIG. 4.
Figure 7:
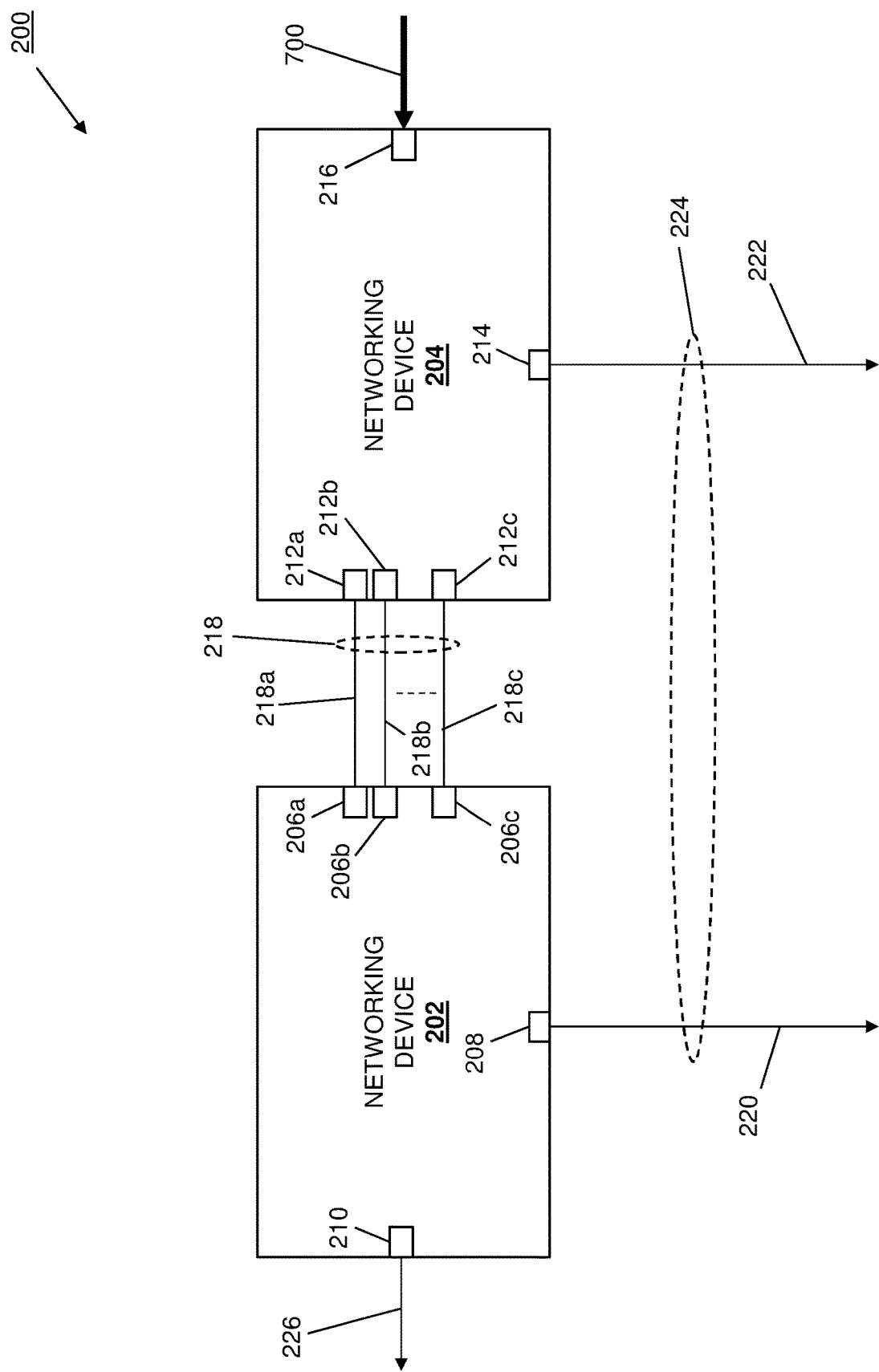
FIG. 7 is a schematic view illustrating an embodiment of the aggregated networking device subsystem of FIG. 2 operating during the method of FIG. 4.

The method 400 then proceeds to block 408 where the first aggregated networking device receives a data packet with the MAC address on a non-ICL port and a static MAC move violation is generated. With reference to FIG. 6, in an embodiment of block 408, the networking device 204/300 may perform data packet receiving operations 600 that include receiving a data packet via the link 222 provided by the LAG port 214 in its communication system 308, and one of skill in the art in possession of the present disclosure will recognize that a variety of devices connected to the link 222 (and the public network to which it is coupled) may generate and transmit that data packet at block 408. Similarly, with reference to FIG. 7, in an embodiment of block 408, the networking device 204/300 may perform data packet receiving operations 700 that include receiving a data packet via the link 228 provided by the orphan port 214 in its communication system 308, and one of skill in the art in possession of the present disclosure will recognize that a variety of devices connected to the link 228 (and the private network to which it is coupled) may generate and transmit that data packet at block 408. In either of the examples above, the data packet received as part of the data packet receiving operations 600 and 700 will include the MAC address that was learned on the orphan port 210 on the networking device 202/300 that has port security enabled and is configured as a station-move-deny port.

The method 400 then proceeds to decision block 410 where the method 400 proceeds depending on whether the non-ICL port on the first aggregated networking device has port security disabled (and, thus, whether the at least one rule programmed at block 406 is satisfied). As discussed above, a network administrator or other user may enable port security on the LAG port 214 on the networking device 204/300 (e.g., due to its connection to a public network), while disabling port security on the orphan port 216 on the networking device 204/300 (e.g., due to its connection to a private network). However, as discussed below, embodiments in which the LAG port 214 on the networking device 204/300 has port security disabled, and/or in which the orphan port 216 has port security enabled, will fall within the scope of the present disclosure as well.

If, at decision block 410, the non-ICL port on the first aggregated networking device has port security enabled, the method 400 proceeds to block 412 where a network processing subsystem in the first aggregated networking device drops the data packet. In an embodiment, at block 412 and in scenarios where the LAG port 214 on the networking device 204/300 has port security enabled, the network processing subsystem that provides the station mode control engine 304 in the networking device 204/300 may receive that data packet as part of the data packet receiving operations 600 and via the LAG port 214. In response, the network processing subsystem that provides the station mode control engine 304 in the networking device 204/300 may then identify the MAC address included in that data packet (which as discussed above is the MAC address that was learned on the orphan port 210 on the networking device 202 that has port security enabled and is configured as a station-move-deny port) and, in response, determine that data packet has generated a static MAC move violation (i.e., based on the static MAC move entry in the MAC address table of the networking device 204/300 that associates that MAC address with the ICL 218 as discussed above). As will appreciated by one of skill in the art in possession of the present disclosure, in response to determining that the data packet received as part of the data packet receiving operations 600 has generated a static MAC move violation, the network processing subsystem that provides the static move control engine 304 in the networking device 204/300 will drop that data packet, and thus the MAC address will remain associated with the ICL 218 as part of the static MAC address entry discussed above, rather than "moving" or otherwise being associated with the LAG port 214.

In another embodiment, at block 412 and in scenarios where the orphan port 216 on the networking device 204/300 has port security enabled, the network processing subsystem that provides the station mode control engine 304 in the networking device 204/300 may receive that data packet as part of the data packet receiving operations 700 and via the orphan port 216. In response, the network processing subsystem that provides the station mode control engine 304 in the networking device 204/300 may then identify the MAC address included in that data packet (which as discussed above is the MAC address that was learned on the orphan port 210 on the networking device 202 that has port security enabled and is configured as a station-move-deny port) and, in response, determine that data packet has generated a static MAC move violation (i.e., based on the static MAC move entry in the MAC address table of the networking device 204/300 that associates that MAC address with the ICL 218 as discussed above). As will appreciated by one of skill in the art in possession of the present disclosure, in response to determining that the data packet received as part of the data packet receiving operations 700 has generated a static MAC move violation, the network processing subsystem that provides the static move control engine 304 in the networking device 204/300 will drop that data packet, and thus the MAC address will remain associated with the ICL 218 as part of the static MAC address entry discussed above, rather than "moving" or otherwise being associated with the orphan port 216.

If at decision block 410, the non-ICL port on the first aggregated networking device has port security disabled, the method 400 proceeds to block 414 where a network processing subsystem in the first aggregated networking device drops the data packet while a hardware device in the first aggregated networking device provides information associated with the data packet to a central processing subsystem in the first aggregated networking device. In an embodiment, at block 414 and in scenarios where the orphan port 216 on the networking device 204/300 has port security disabled, the network processing subsystem that provides the station mode control engine 304 in the networking device 204/300 may receive that data packet as part of the data packet receiving operations 700 and via the orphan port 216. In response, the network processing subsystem that provides the station mode control engine 304 in the networking device 204/300 may then identify the MAC address included in that data packet (which as discussed above is the MAC address that was learned on the orphan port 210 on the networking device 202 that has port security enabled and is configured as a station-move-deny port) and, in response, determine that data packet has generated a static MAC move violation (i.e., based on the static MAC move entry in the MAC address table of the networking device 204/300 that associates that MAC address with the ICL 218 as discussed above). As will appreciated by one of skill in the art in possession of the present disclosure, in response to determining that the data packet received as part of the data packet receiving operations 700 has generated a static MAC move violation, the network processing subsystem that provides the static move control engine 304 in the networking device 204/300 will drop that data packet.

However, block 414 will also include the hardware device (e.g., a field processor) that provides the station mode control engine 304 in the networking device 204/300 executing the at least one rule programmed at block 406 (e.g., the field processor entry discussed above) to determine that data packet has generated a static MAC move violation but was received on a port that has port security disabled and, in response, the hardware device that provides the station mode control engine 304 in the networking device 204/300 will "lift" or otherwise provide information associated with that data packet (e.g., the MAC address included in that data packet, the identity of the orphan port 216, etc.) to the central processing subsystem that provides the station move control engine 314 in the networking device 204/300.

In another embodiment, at block 414 and in scenarios where the LAG port 214 on the networking device 204/300 has port security disabled, the network processing subsystem that provides the station mode control engine 304 in the networking device 204/300 may receive that data packet as part of the data packet receiving operations 600 and via the LAG port 214. In response, the network processing subsystem that provides the station mode control engine 304 in the networking device 204/300 may then identify the MAC address included in that data packet (which as discussed above is the MAC address that was learned on the orphan port 210 on the networking device 202 that has port security enabled and is configured as a station-move-deny port) and, in response, determine that data packet has generated a static MAC move violation (i.e., based on the static MAC move entry in the MAC address table of the networking device 204/300 that associates that MAC address with the ICL 218 as discussed above). As will appreciated by one of skill in the art in possession of the present disclosure, in response to determining that the data packet received as part of the data packet receiving operations 600 has generated a static MAC move violation, the network processing subsystem that provides the static move control engine 304 in the networking device 204/300 will drop that data packet.

However, block 414 will also include the hardware device (e.g., a field processor) that provides the station mode control engine 304 in the networking device 204/300 executing the at least one rule programmed at block 406 (e.g., the field processor entry discussed above) and determining that data packet has generated a static MAC move violation but was received on a port that has port security disabled and, in response, the hardware device that provides the station mode control engine 304 in the networking device 204/300 will "lift" or otherwise provide information associated with that data packet (e.g., the MAC address included in that data packet, the identity of the LAG port 214, etc.) to the central processing subsystem that provides the station move control engine 314 in the networking device 204/300.

Figure 8:
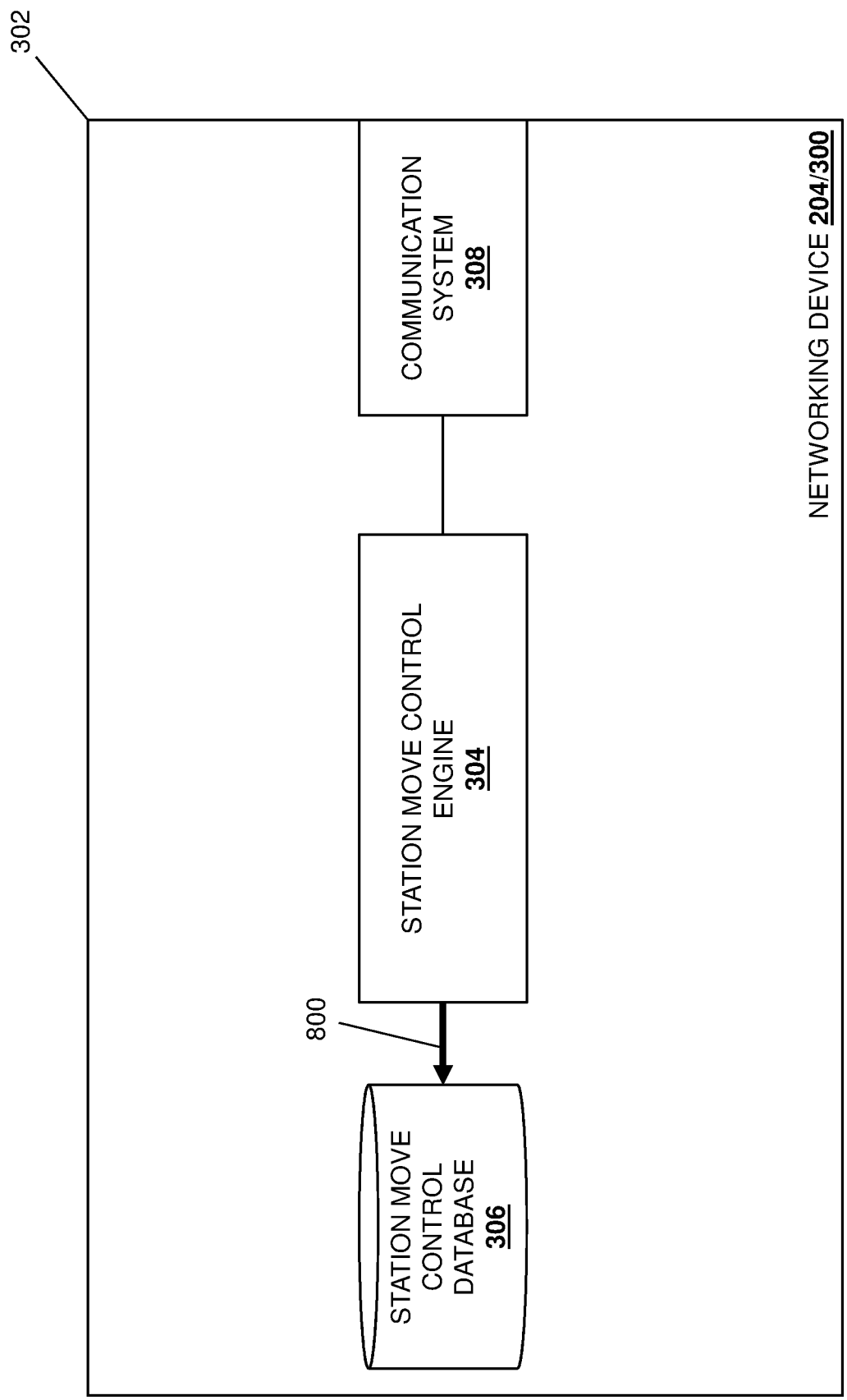
FIG. 8 is a schematic view illustrating an embodiment of the networking device of FIG. 3 operating during the method of FIG. 4.

The method 400 then proceeds to block 416 where the central processing subsystem in the first aggregated networking device associates the MAC address with the non-ICL port on the first aggregated networking device. As illustrated in FIG. 8, in an embodiment of block 416 and in response to receiving information associated with a data packet from the hardware device that provides the station move control engine 314 in the networking device 204/300, the central processing subsystem that provides the station move control engine 314 in the networking device 204/300 may perform MAC address association operations 800 that include generating a dynamic MAC address entry in a MAC address table in the station move control database 306 in the networking device 204/300 that associates the MAC address in that data packet with the non-ICL port on the networking device 204/300 upon which it was received (e.g., the LAG port 214 when the data packet was received in the data packet receiving operations 600, or the orphan port 216 when the data packet was received in the data packet receiving operations 700). As will be appreciated by one of skill in the art in possession of the present disclosure, the association of the MAC address in that data packet with the non-ICL port on the networking device 204/300 upon which it was received will allow subsequent data packets that include that MAC address to be received by that non-ICL port, while the previous association of that MAC address with the ICL 218 will be removed from the MAC address table in the networking device 204/300.

Thus, when a data packet is received via a non-ICL port on the networking device 204 that has port security disabled and generates a static MAC move violation, the hardware device that provides the static move control engine 304 in the networking device 204/300 will provide information associated with that data packet to the central processing subsystem so that the MAC address in that data packet may be associated with the non-ICL port on which it was received. As will be appreciated by one of skill in the art in possession of the present disclosure, the provisioning of the MAC address received at the port-security-enabled/station-move-deny configured orphan port 210 on the networking device 202 in a static MAC address entry in the MAC address table in the networking device 204 prevents that MAC address from moving from the port-security-enabled/station-move-deny configured orphan port 210 on the networking device 202 to port-security-enabled non-ICL ports on the networking device 204, while the combination of the hardware rule and central processing subsystem programming/association of the MAC address with the non-ICL port on the networking device 204 on which it was received allows that MAC address to move from the port-security-enabled/station-move-deny configured orphan port 210 on the networking device 202 to port-security-disabled non-ICL ports on the networking device 204.

Thus, systems and methods have been described that provide, when a MAC address is learned on an port-security-enabled orphan port on a second VLT node, for the generation of a static MAC address entry in a first VLT node that associates that MAC address with an ICL that connects the first and second VLT nodes, and the programming of a field processor entry that associates that MAC address with non-ICL ports on the first VLT node when it is received on those non-ICL ports that have their port security disabled. For example, the VLT pair station move control system of the present disclosure may include first and second VLT nodes connected via an ICL and aggregated to provide an VLT pair. The first VLT node receives a MAC address from the second VLT node that was learned on an orphan port that has port security enabled, and generates a static MAC address entry in its MAC address table that associates the MAC address with the ICL. The static MAC address entry causes data packets received on non-ICL ports on the first VLT node that include the MAC address to generate a static MAC move violation. The first VLT node also programs a field processor entry that, in response to data packets being received on its non-ICL ports that have port security disabled and generating a static MAC move violation, causes the association of the MAC address with that non-ICL port. As such, station move control functionality that is conventionally only available on a single networking device may be provided across an VLT nodes in an aggregated VLT pair.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An aggregated networking device subsystem station move control system, comprising:
 a second aggregated networking device; and
 a first aggregated networking device that is coupled to the second networking device via an Inter-Chassis Link (ICL) and aggregated with the second networking device to provide an aggregated networking device subsystem, wherein the first aggregated networking device is configured to:
  receive, from the second aggregated networking device, a Media Access Control (MAC) address that was learned on an orphan port that is included on the second aggregated networking device, that has port security enabled, and that is configured as a station-move-deny port;
  generate, in a MAC address table associated with the first aggregated networking device, a static MAC address entry that associates the MAC address with the ICL, wherein the static MAC address entry is configured to cause data packets that are received on non-ICL ports on the first aggregated networking device and that include the MAC address to generate a static MAC move violation; and program, in the first aggregated networking device, at least one rule that, in response to a data packet being received on a non-ICL port on the first aggregated networking device that has port security disabled and generating a static MAC move violation, causes the association of the MAC address with that non-ICL port.

2. The system of claim 1, wherein the first aggregated networking device includes a network processing subsystem that is configured to:

receive a first data packet that includes the MAC address on a first non-ICL port on the first aggregated networking device;

determine that the first data packet has generated a static MAC move violation based on the static MAC address entry; and drop the first data packet.

3. The system of claim 2, wherein the first non-ICL port on the first aggregated networking device has port security enabled.

4. The system of claim 2, wherein the first aggregated networking device includes at least one hardware device that is configured to:

determine, based on the at least one rule, that the first non-ICL port on the first aggregated networking device has port security disabled; and forward, based on the at least one rule, information associated with the first data packet to a central processing subsystem included in the first aggregated networking device.

5. The system of claim 4, wherein the central processing subsystem is configured to:

receive the information associated with first data packet from the at least one hardware device; and associate the MAC address with the first non-ICL port on the first aggregated networking device.

6. The system of claim 1, wherein the aggregated networking device subsystem utilizes a Virtual Link Trunking (VLT) protocol.

7. An Information Handling System (IHS), comprising:

a processing system; and a memory system that is coupled to the processing system and that includes instructions that, when executed by the processing system, cause the processing system to provide a station move control engine that is configured to:

receive, from an aggregated networking device, a Media Access Control (MAC) address that was learned on an orphan port that is included on the aggregated networking device, that has port security enabled, and that is configured as a station-move-deny port;

generate, in a MAC address table, a static MAC address entry that associates the MAC address with an ICL that connects the processing system to the aggregated networking device, wherein the static MAC address entry is configured to cause data packets that are received on non-ICL ports connected to the processing system and that include the MAC address to generate a static MAC move violation; and program at least one rule that, in response to a data packet being received on a non-ICL port connected to the processing system that has port security disabled and generating a static MAC move violation, causes the association of the MAC address with that non-ICL port.

8. The IHS of claim 7, wherein the processing system includes a network processing subsystem that is configured to:

receive a first data packet that includes the MAC address on a first non-ICL port connected to the processing system;

determine that the first data packet has generated a static MAC move violation based on the static MAC address entry; and drop the first data packet.

9. The IHS of claim 8, wherein the first non-ICL port connected to the processing system has port security enabled.

10. The IHS of claim 8, wherein the processing system includes at least one hardware device that is configured to:

determine, based on the at least one rule, that the first non-ICL port connected to the processing system has port security disabled; and forward, based on the at least one rule, information associated with the first data packet to a central processing subsystem included in the processing system.

11. The IHS of claim 10, wherein the central processing subsystem is configured to:

receive the information associated with the first data packet from the at least one hardware device; and associate the MAC address with the first non-ICL port connected to the processing system.

12. The IHS of claim 10, wherein the at least one hardware device includes a field processor, and wherein the at least one rule includes a field processor entry.

13. The IHS of claim 7, wherein the aggregated networking device utilizes a Virtual Link Trunking (VLT) protocol.

14. A method for providing station move control in an aggregated networking device subsystem, comprising:

receiving, by a first aggregated networking device from a second aggregated networking device that is aggregated with the first networking device to provide an aggregated networking device subsystem, a Media Access Control (MAC) address that was learned on an orphan port that is included on the second aggregated networking device, that has port security enabled, and that is configured as a station-move-deny port;

generating, in a MAC address table associated with the first aggregated networking device, a static MAC address entry that associates the MAC address with an Inter-Chassis Link (ICL) that couples the first aggregated networking device to the second aggregated networking device, wherein the static MAC address entry is configured to cause data packets that are received on non-ICL ports on the first aggregated networking device and that include the MAC address to generate a static MAC move violation; and programming, by the first aggregated networking device, at least one rule that, in response to a data packet being received on a non-ICL port on the first aggregated networking device that has port security disabled and generating a static MAC move violation, causes the association of the MAC address with that non-ICL port.

15. The method of claim 14, further comprising:

receiving, by a network processing subsystem in the first aggregated networking device, a first data packet that includes the MAC address on a first non-ICL port on the first aggregated networking device;

determining, by the network processing subsystem, that the first data packet has generated a static MAC move violation based on the static MAC address entry; and dropping, by the network processing subsystem, the first data packet.

16. The method of claim 15, wherein the first non-ICL port on the first aggregated networking device has port security enabled.

17. The method of claim 15, further comprising:

determining, by at least one hardware device in the first aggregated networking device based on the at least one rule, that the first non-ICL port on the first aggregated networking device has port security disabled; and forwarding, by the at least one hardware device based on the at least one rule, information associated with the first data packet to a central processing subsystem included in the first aggregated networking device.

18. The method of claim 17, further comprising:

receiving, by the central processing subsystem, the information associated with the first data packet from the at least one hardware device; and associating, by the central processing subsystem, the MAC address with the first non-ICL port on the first aggregated networking device.

19. The method of claim 17, wherein the at least one hardware device includes a field processor, and wherein the at least one rule includes a field processor entry.

20. The method of claim 14, wherein the aggregated networking device utilizes a Virtual Link Trunking (VLT) protocol.

* * * * *